(12) United States Patent
Christin et al.

(10) Patent No.: US 9,036,664 B2
(45) Date of Patent: May 19, 2015

(54) METHOD AND DEVICE FOR TRANSMITTING, METHOD FOR RECEIVING AND DESTINATION DEVICE, CORRESPONDING MULTICARRIER SIGNAL AND COMPUTER PROGRAM

(75) Inventors: Philippe Christin, Rennes (FR); Laurent Cariou, Rennes (FR); David Bernard, Marcille Raoul (FR)

(73) Assignee: ORANGE, Paris (FR)

( * ) Notice: Subject to any disclaimer, the term of this patent is extended or adjusted under 35 U.S.C. 154(b) by 306 days.

(21) Appl. No.: 13/583,526

(22) PCT Filed: Mar. 4, 2011

(86) PCT No.: PCT/FR2011/050455
§ 371 (c)(1),
(2), (4) Date: Nov. 29, 2012

(87) PCT Pub. No.: WO2011/110778
PCT Pub. Date: Sep. 15, 2011

(65) Prior Publication Data
US 2013/0070697 A1      Mar. 21, 2013

(30) Foreign Application Priority Data
Mar. 8, 2010   (FR) ..................... 10 51671

(51) Int. Cl.
*H04J 3/22*      (2006.01)
*H04W 76/02*    (2009.01)
(Continued)

(52) U.S. Cl.
CPC ........... *H04W 76/025* (2013.01); *H04L 5/0007* (2013.01); *H04L 5/001* (2013.01); *H04L 5/003* (2013.01); *H04L 5/0053* (2013.01); *H04L 5/0094* (2013.01); *H04W 72/0453* (2013.01)

(58) Field of Classification Search
None
See application file for complete search history.

(56) References Cited

U.S. PATENT DOCUMENTS

| 2006/0092892 | A1  | 5/2006 | Trachewsky |
| 2007/0002800 | A1* | 1/2007 | Sondur et al. ................. 370/332 |
| 2008/0220788 | A1  | 9/2008 | Stanwood et al. |

(Continued)

OTHER PUBLICATIONS

International Search Report and Written Opinion dated Apr. 18, 2011 for corresponding International Application No. PCT/FR2011/050455, filed on Mar. 4, 2011.

(Continued)

*Primary Examiner* — Jay P Patel
(74) *Attorney, Agent, or Firm* — David D. Brush; Westman, Champlin & Koehler, P.A.

(57) ABSTRACT

A method for transmitting data packets in a communication network using a plurality of radio frequency channels, at least two of the radio frequency channels being concatenated to form a concatenated channel. The method includes: acquiring and reserving at least one of the channels from the concatenated channel, thus reserving a first frequency band for transmitting data packets to a first target device; acquiring and reserving channels from the concatenated channel that were unreserved during the first step of acquisition and reservation, thus reserving a second frequency band for transmitting data packets to a second target device; generating a preamble specific to a selected data packet, which includes a simultaneous transmission indicator on the first and second frequency bands; and simultaneously transmitting the data packets on the first and second frequency bands, from the selected packet and the specific preamble, before the selected packet on the second frequency band.

15 Claims, 4 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2010/0296472 A1* | 11/2010 | Lee et al. | 370/329 |
| 2013/0201835 A1* | 8/2013 | Banerjea et al. | 370/241 |
| 2013/0265965 A1* | 10/2013 | Amini et al. | 370/329 |
| 2014/0233491 A1* | 8/2014 | Kwon et al. | 370/329 |

OTHER PUBLICATIONS

International Preliminary Report on Patentability and English Translation of the Written Opinion dated Sep. 18, 2012 for corresponding International Application No. PCT/FR20111050455, filed on Mar. 4, 2011.

French Search Report and Written Opinion dated Oct. 21, 2010 for corresponding French Application No. 1051671 filed Mar. 8, 2010.

* cited by examiner

METHOD AND DEVICE FOR TRANSMITTING, METHOD FOR RECEIVING AND DESTINATION DEVICE, CORRESPONDING MULTICARRIER SIGNAL AND COMPUTER PROGRAM

CROSS-REFERENCE TO RELATED APPLICATIONS

This Application is a Section 371 National Stage Application of International Application No. PCT/FR2011/050455, filed Mar. 4, 2011, which is incorporated by reference in its entirety and published as WO 2011/110778 on Sep. 15, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radiofrequency communications.

More specifically, the disclosure pertains to the management of the frequency resources of devices sending in a radiofrequency system, and more particularly to the mechanism for transmitting data packets that can be used in this system.

The disclosure finds application especially in the management of frequency resources of devices sending in frequency bands situated around 2.4 GHz or 5 GHz, in which there function especially devices according to the IEEE 802.11a, b, g, n standards or the revised versions or future versions, also known as WiFi standards.

The term "device" is understood here to mean an element belonging to a basic service set (BSS) formed by an access point and the stations associated with this access point, i.e. the stations situated in the coverage zone of this access point.

BACKGROUND OF THE DISCLOSURE

The different IEEE 802.11a, b, g, n WiFi standards use transmission frequency channels that can be equal to a frequency width of 20 MHz to 40 MHz (40 MHz being a concatenation of two 20 MHz radiofrequency channels or frequency bands without overlapping), or can even allow transmission on an 80 MHz frequency band in concatenating four 20 MHz radiofrequency channels which may or may not be contiguous, in a future version of the IEEE 802.11n WiFi standard.

Frequently, several WiFi access points are located in the same frequency bands and in the same spatial environment. These are then said to be overlapping basic service sets. Thus, a radiofrequency channel or a frequency band has to be shared between the different basic service sets (BSSs).

This is done in the classic way by using the CSMA-CA (Carrier Sense Multiple Access-Collision Avoidance) mode, as described in the standard 802.11-2007, paragraph 9.1 "MAC architecture", 9.1.1 "DCF".

The CSMA-CA mechanism illustrated in FIG. 1 ensures a sharing of the access to a radiofrequency channel according to a principle known as that of contention: each device must listen to see whether the channel is free (i.e. that no signal is being sent/received in this channel) for a variable duration, corresponding to an arbitrary inter-frame duration known as the AIFS ("arbitration inter-frame space") and a random waiting period (denoted as B for "backoff") before transmitting data.

In practice, during the contention period, the access point decrements the backoffs for each packet waiting in the queues so long as the channel is free.

Should several radiofrequency channels be concatenated, the channel being listened to is called a primary channel referenced 1 in FIG. 1.

Should the first packet in the queue have to be transmitted on a 20 MHz frequency band and be therefore likely to gain access to the channel (if no channel takes uplink control of the channel before the end of the countdown), then only the primary channel is listened to (FIG. 1).

In the case of the future standard which will enable transmission on an 80 MHz frequency band in concatenating four radiofrequency channels, the new generation of devices, here below called "high throughput" or "HT" devices, i.e. devices capable of implementing this standard, can transmit on an 80 MHz frequency band.

By contrast, the former-generation devices (i.e. devices that implement earlier standards), here below called legacy devices, cannot transmit on an 80 MHz frequency band.

Now, for reasons of backward compatibility, the CSMA-CA mechanism enables each device, whether a legacy device or a new-generation device, to "take control" of a channel or a frequency band to make transmission at 20 MHz, 40 MHz or 80 MHz.

One drawback of this prior-art technique lies in the fact that if an access point takes control of a channel to transmit data to a legacy station limited for example to a 20 MHz frequency band (or to an HT station for a packet that does not require the use of more than 20 MHz), the remaining 60 MHz of the 80 MHz frequency band of the concatenated channel are not used. The spectral efficiency of the basic service set is severely reduced.

Similarly, a present-day technique known as a "20/40 mechanism" and defined in the IEEE 802.11n standard enabling transmission on a frequency band greater than 20 MHz, i.e. 40 MHz in this case, allows a device (a station or an access point) wishing to transmit data packets on a 40 MHz frequency band to a single user, known as the destination device (namely the access point or a station respectively), to reserve this 40 MHz frequency band. However this standard does not enable the transmission of data packets on a 40 MHz frequency band to several destination devices.

Finally, the OFDMA multiple-access technique enables the transmission of the data packets to two destination devices on an 80 MHz frequency band in using distinct carriers of this frequency band respectively for each of the destination devices and in informing each of the destination devices as to which carriers concern it. The destination devices must therefore be compatible with this technique, in order to recognize the signaling by which they are able to know which carriers concern them.

There is therefore a need for a novel technique enabling optimum use of an available frequency band to transmit data packets to different destination devices, whether of the old or the new generation, so as to optimize the spectral efficiency and the total throughput rate of a basic service set.

SUMMARY

An embodiment of the invention relates to a method for transmitting data packets in a communications network using a plurality of radiofrequency channels, at least two of the radiofrequency channels being concatenated to form a concatenated channel.

According to the invention, such a method comprises:
- a first step for acquiring and reserving at least one of the radiofrequency channels of the concatenated channel, reserving a first frequency band for the transmission of data packets to a first destination device;
- a second step for acquiring and reserving radiofrequency channels of the concatenated channel not reserved during the first step for acquiring and reserving, reserving a second frequency band for the transmission of data packets to at least one second destination device;
- a step of simultaneous sending of the data packets on the first and second frequency bands.

Thus, an embodiment of the invention relies on a novel and inventive approach to the management of frequency resources allocated to at least one device, in a communications network using a plurality of radiofrequency channels, at least two of which are concatenated, or aggregated, to form a concatenated channel.

For example, a concatenated channel is formed by four 20 MHz radiofrequency channels, enabling transmission on 80 MHz.

In the context of WiFi type communications for example, these destination devices correspond to stations associated with an access point, in a basic service set (BSS) as described here above with reference to the prior art.

In particular, an embodiment of the invention implements a first step for acquiring and reserving a first frequency band formed by at least one radiofrequency channel of the concatenated channel, to transmit data packets to a first destination device. This first destination device is, for example, a legacy station capable of sending and receiving data packets on 20 MHz or an HT station capable of sending and receiving data packets on 20, 40 or 60 MHz.

According to one particular embodiment of the invention, this first step for acquiring and reserving a first frequency band implements the CSMA-CA mechanism already described here above with reference to the prior art and described in detail further below.

Thus an access point attempts, for example, to access a 20 MHz frequency band, corresponding to a radiofrequency band of an 80 MHz concatenated channel, and then reserves this band, when it is free, to transmit data packets addressed to a legacy station or to transmit data packets that do not require a bigger frequency band, to an associated HT station.

According to another example, an access point attempts to access and reserve a first 40 MHz frequency band, then formed by two radiofrequency channels of the 80 MHz concatenated channel to transmit data packets to an HT station capable of sending and receiving on a 40 MHz frequency band.

A second step for acquiring and reserving consists in reserving a second frequency band formed by radiofrequency channels of the concatenated channel not reserved during the first step, for the transmission of the data packets to a second destination device.

Thus, again in the case of an 80 MHz concatenated channel, when an access point reserves a first 20 MHz frequency band (corresponding to a radiofrequency channel) to transmit data packets to a first destination device, for example a legacy station, the access point tries also to access the second 60 MHz frequency band corresponding to the three other radiofrequency channels as yet unreserved and then reserves it to transmit data packets, when this second band is free, to a second destination device, for example an HT station.

According to another example, if an access point reserves a first 40 MHz frequency band, formed in this case by two radiofrequency channels of the 80 MHz concatenated channel, to transmit data packets to an HT station, the access point also tries to access a second 40 MHz frequency band corresponding to two other as yet unreserved radiofrequency channels and then reserves this second frequency band to transmit data packets, when this second band is free, to a second HT station.

These first and second frequency bands are then used to simultaneously send the data packets addressed to first and second destination devices respectively, thus optimizing the occupancy of the concatenated channel.

It must be noted that, in one particular embodiment of the invention, the first and second destination devices can correspond to one and the same device.

According to one particular aspect of the invention, the method comprises at least one step for selecting a data packet from among the data packets to be transmitted towards at least one second destination device and the sending step sends the selected packet on the second frequency band.

Indeed, since an access point can be called upon to work for a plurality of associated stations, there may be a plurality of packets to be transmitted to several destination devices, these packets being stored in one or more queues before they are processed by the access point.

Furthermore, as we have seen here above, since the second frequency band reserved by the access point is constituted by a radiofrequency channel not reserved during the first step for acquiring and reserving, it may have different characteristics, depending on the first frequency band reserved. For example, it may enable transmission on 60, 40 or 20 MHz depending on the size of the first frequency band reserved.

Thus, the method according to this embodiment of the invention provides for the selecting, among the data packets in the queue of the access point, of that data packet or those data packets which will be transmitted on the second frequency band reserved during the second step for acquiring and reserving.

In this way, the access point chooses the packet or packets to be transmitted on the second frequency band so as to optimize its use.

For example, the step for selecting comprises a first sub-step for selecting a set of at least one data packet from among the data packets to be transmitted to at least one second destination device in taking account of the duration of transmission of the packets and the capacity of the second destination device to receive data packets on the second frequency band.

Thus, from among the data packets awaiting transmission, the access point chooses a set of packets addressed to a destination packet capable of implementing an embodiment of the invention, i.e. capable of sending and receiving data packets on the reserved second frequency band. Indeed, among the waiting packets, those addressed to a legacy station cannot be chosen, since the legacy station is not capable of receiving on the second reserved frequency band.

From this set of data packets addressed to stations capable of implementing an embodiment of the invention, packets are then selected according to the duration of transmission of the packets present in the queue and the capacity of the second reserved frequency band.

For example, the first selection sub-step selects packets having a transmission time smaller than the transmission time of the packets to be transmitted to the first destination packet.

Indeed, since the sending of the packet is simultaneous on the first and second frequency bands, the packets sent on the second frequency band must not take more time to transmit than those sent on the first frequency band, the transmission times of the packets being computed in taking account of the respective characteristics of the first and second frequency bands.

According to another example, at least two packets of the set are aggregated so as to form a single packet.

Thus, if the packet or packets selected for sending on the second frequency band to the second destination device, simultaneously with those sent on the first frequency band to the first destination device, have a transmission time smaller than that of the packets to be sent on the first frequency band, then the method according to an embodiment of the invention enables the aggregating of the packets present in the queue or queues, addressed to the second destination device, for example according to a known technique defined in the IEEE 802.11n standard.

Once a set of packets has been selected, from among the packets present in the queue or queues to be transmitted by the access point, the step for selecting comprises a second substep for selecting a data packet in the set, delivering the selected packet, the second sub-step for selecting taking account of at least one of the criteria belonging to the group comprising:
- a criterion of priority taking account of the type of data of the packet;
- a duration of transmission of the data packet for a predetermined transmission throughput rate.

Thus, the method according to this embodiment of the invention makes it possible to optimize the use of the second frequency band, in choosing a packet to be sent on the second frequency band simultaneously with the packet sent on the first frequency band as a function of a predetermined criterion of optimization.

For example, a criterion of optimization is a criterion of a priority understood in terms of type of data of the packet or service class to which the packet in question belongs. For example, a "best effort" type of packet (i.e. a packet without any particular priority) or a "background" type packet (i.e. a packet to be processed last) has lower priority than a "voice" type packet requiring real-time transmission or again a "video" type packet requiring high-quality transmission. These service classes are indicated for example in the "QoS control/TID" field of the MAC header §7.1.3.5 of the 802.11e standard.

Another criterion of optimization can take account of the packet transmission time, as compared with a predetermined transmission throughput rate, making it possible to determine a penalizing factor associated with a packet, representing an estimated occupancy of the channel for the transmission of this packet. Thus, a criterion might consist in choosing the packet which would most penalize the other destination devices if it were transmitted in "classic" fashion, for example by using only one 20 MHz frequency band.

The criteria are described in greater detail here below with reference to one or more embodiments of the invention.

According to one particular embodiment of the invention, the method comprises a step for generating at least one preamble specific to the selected packet, the preamble or preambles comprising at least one indicator of simultaneous sending on the first and second frequency bands and the sending step sends the specific preamble or preambles, before the selected packet, on the second frequency band.

This embodiment of the invention corresponds to a transmission to a legacy station on the first frequency band and a transmission towards an HT station capable of implementing an embodiment of the invention, on the second frequency band.

This embodiment makes it possible to inform the second destination device, through one or more preambles, of simultaneous sending on the first and second frequency band so that it can decode the packets that are addressed to it, i.e. those sent on the second frequency band.

In particular, this preamble or these preambles (depending on alternative embodiments) are sent only on the second frequency band, so as not to modify transmission addressed to a first legacy destination device on the first frequency band.

The simultaneous sending on the first and second frequency bands is therefore "concealed" for this legacy device, thus making it possible to comply with the constraint of backward compatibility.

According to a second embodiment, the method comprises a step for generating at least one preamble specific to the data packets addressed to the first destination device, the specific preamble or preambles comprising at least one indicator of simultaneous sending on the first and second frequency bands and the sending step sends the specific preamble or preambles, before the packets, on the first frequency band.

This embodiment corresponds to a transmission to a first HT station, capable of implementing an embodiment of the invention, on the first frequency band and transmission to a second HT station, capable of implementing an embodiment of the invention, on the second frequency band.

This embodiment makes it possible to inform the first destination device, through one or more preambles, of the simultaneous sending on the first and second frequency bands so that it can decode the packets that are addressed to it, i.e. those sent on the first frequency band.

According to this embodiment, it is also planned to generate at least one preamble specific to the selected packet, the preamble or preambles comprising at least one indicator of simultaneous sending on the first and second frequency bands and the sending step sends the specific preamble or preambles before the selected packet on the second frequency band.

Thus, the second destination device, in this case the second HT station capable of implementing an embodiment of the invention, is also informed of the simultaneous sending, so that it can decode the packets addressed to it, i.e. those sent on the second frequency band.

It must be noted that the preambles, sent respectively on the first or the second frequency band, are specific to the packets to be sent addressed respectively to the first and second HT stations capable of implementing an embodiment of the invention.

In particular, the specific preamble furthermore comprises at least one indicator belonging to the group comprising:
- indicator of order of simultaneous sending;
- indicator of the radiofrequency channel or channels forming the second frequency band;
- indicator of the radiofrequency channel or channels forming the first frequency band;
- indicator of the second destination device;
- indicator of the first destination device.

Thus, depending on different alternative embodiments, the specific preamble or preambles sent to provide information about simultaneous sending to the HT stations capable of implementing an embodiment of the invention and receiving data packets sent by the first and/or second frequency bands also include indicators enabling a more efficient definition of this simultaneous sending.

For example, an indicator indicates that the simultaneous sending is implemented on the channel 2 of the concatenated channel, it being known that the radiofrequency channel used to form the first frequency band for transmission towards the legacy station is referenced channel 1.

According to another example, an indicator indicates that the channels 2 to 4 of the concatenated channel forming the second frequency band are used for transmission to an HT station implementing an embodiment of the invention.

According to yet another example, an indicator indicates an identifier of an HT destination device so that this device can be informed of the packets addressed to it, etc.

According to one particular characteristic of an embodiment of the invention, the first and second steps for acquiring and reserving implement:

an operation for listening to one of the radiofrequency channels forming the first frequency band, denoted as a primary channel, for a predetermined duration, and an operation for listening to the other radiofrequency channels of the concatenated channel for a duration equal to one inter-frame for controlled access by a transmission device, denoted as PIFS, having an end that coincides with the end of the predetermined duration.

Thus, according to one embodiment of the invention, the first step for acquiring and reserving implements the known mechanism of access to the CSMA-CA channel, already described with reference to the prior art and consisting in listening a channel called a primary channel for a variable duration, corresponding to an arbitrary inter-frame duration known as the AIFS (arbitration inter-frame space) and a random waiting duration (denoted as B for backoff) before transmitting data.

According to this embodiment, the second step for acquiring and reserving implements a simplified mechanism of listening to the other channels forming the concatenated channel, for a period denoted as PIFS which is shorter than the period AIFS and the end of which coincides with the end of the AIFS.

Thus, if the primary channel and the other channels being listened to are free, the simultaneous transmission can start on the first and second reserved frequency bands.

In this way, even if the access point has to send packets only on the primary channel, to a legacy station for example, it listens to the other channels of the concatenated channel called secondary, tertiary and quaternary channels in the case of a concatenated 80 MHz channel and is therefore informed of the occupancy of these channels at the same time as the occupancy of the primary channel.

According to one particular characteristic of an embodiment of the invention, the method comprises a step for receiving, on at least one of the radiofrequency channels composing the first frequency band, denoted as a primary channel, acknowledgements associated with the packets sent simultaneously on the first and second frequency bands.

Thus, the access point receives, on the primary channel, the acknowledgements of reception of the packets sent simultaneously on the first and second frequency bands, coming from the devices to which these packets are addressed. Thus, even if the packets are sent on channels other than the primary channel, the acknowledgements for their part are received on the primary channel by the access point, facilitating its management of the acknowledgements for all the packets sent simultaneously.

Another aspect of the invention pertains to a device for transmitting data packets in a communications network using a plurality of radiofrequency channels, at least two of the radiofrequency channels being concatenated to form a concatenated channel.

According to an embodiment of the invention, such a device for transmitting comprises:

first means for acquiring and reserving at least one of the radiofrequency channels of the concatenated channel, reserving a first frequency band for the transmission of data packets to a first destination device;

second means for acquiring and reserving radiofrequency channels of the concatenated channel not reserved by said first means for acquiring and reserving, reserving a second frequency band for the transmission of data packets to at least one second destination device;

means for simultaneously sending the data packets on the first and second frequency bands.

Such a device for transmitting is especially suited to implementing the method for transmitting described here above. It may for example be an access point or a WiFi station.

This device for transmitting could of course comprise the different characteristics pertaining to the method for transmitting according to an embodiment of the invention. Thus, the characteristics and advantages of this device for transmitting are the same as those of the method for transmitting and are not described in greater detail.

An embodiment of the invention also pertains to a method for receiving data packets in a communications network using a plurality of radiofrequency channels, at least two of the radiofrequency channels being concatenated to form a concatenated channel.

According to an embodiment of the invention, such a method for receiving comprises:

a step for receiving data packets sent simultaneously on a first and second frequency bands, the first frequency band being formed by at least one of the radiofrequency channels of the concatenated channel and the second frequency band being formed by the other radiofrequency channels of the concatenated channel;

a step for decoding data packets sent on only one of the first and second frequency bands as a function of the signaling received on at least one of the first and second frequency bands.

Thus, the method for receiving according to an embodiment of the invention relies on a novel and inventive approach to the decoding of data packets when these packets are sent simultaneously on two frequency bands, enabling the decoding only of the data packets sent on either of these frequency bands as a function of a signaling sent on either of these frequency bands.

This signaling makes it possible to inform a destination device of the frequency band which is addressed to it and on which the device then decodes the data packets.

For example, when the method for receiving according to an embodiment of the invention is implemented in an HT station, this station receives the data sent simultaneously on the two frequency bands and decodes only data addressed to it, for example data sent on the second reserved frequency band. The HT station is informed of the destination of the data by a specific signaling received before the data packets on this second frequency band.

If the data packets sent on the first frequency band are addressed to a legacy station, no specific signaling is sent on the first frequency band and the legacy station is not informed of a simultaneous sending of packets on a second frequency band, addressed to another device.

In particular, the method for receiving comprises a step for receiving at least one specific preamble sent on the first and/or second frequency bands, and the step for decoding is implemented either on the packets sent on the first frequency band or on the packets sent on the second frequency band, as a function of at least one indicator of simultaneous sending present in the specific preamble or preambles.

According to one embodiment of the invention, the data packets sent on each of the reserved frequency bands are preceded by a specific preamble so as to inform the destination devices of the frequency band that is addressed to them. Thus, once the signaling has been received and processed, the destination devices decode only the packets addressed to them.

According to one particular characteristic of an embodiment of the invention, the method for receiving comprises a step for sending, on one of the radiofrequency channels forming the first frequency band, denoted as a primary channel, an acknowledgment of reception of a packet sent on the second frequency band, the step for sending an acknowledgement being implemented after detection of an acknowledgment of reception of a packet sent simultaneously on the first frequency band.

Thus, the destination device receiving the packet sent on the second frequency band sends an acknowledgment of reception of these packets on the primary channel, addressed to the access point. Furthermore, the sending of this acknowledgement by the destination device is implemented after detection of the sending of the acknowledgement corresponding to the reception of the packet sent simultaneously on the first frequency band. In this way, the access point receives first of all the acknowledgment of reception of the packet sent on the frequency band and then the acknowledgment of reception of the packet sent on the second frequency band whatever the size of the packets sent on the second frequency band.

This mechanism therefore enables a management of the acknowledgements that is independent of the frequency bands and the size of the packets sent on these frequency bands.

An embodiment of the invention also pertains to a destination device for receiving data packets in a communications network using a plurality of radiofrequency channels, at least two of the radiofrequency channels being concatenated to form a concatenated channel.

According to an embodiment of the invention, such a destination device, or station, comprises:
- means for receiving data packets sent simultaneously on a first and second frequency bands, the first frequency band being formed by at least one of the radiofrequency channels of the concatenated channel and the second frequency band being formed by the non-reserved radiofrequency channels of the concatenated channel;
- means for decoding data packets sent on only one of the first and second frequency bands as a function of the signaling received on at least one of the first and second frequency bands.

Such a device is especially suited to implementing the method for receiving described here above. It may for example be a station of a basic services set in the case of WiFi transmission.

This device could of course comprise the different characteristics pertaining to the method for receiving according to an embodiment of the invention. Thus, the characteristics and advantages of this device are the same as those of the method for receiving and are not described in greater detail Another aspect of the invention pertains to a multicarrier signal sent in a communications network using a plurality of radiofrequency channels, at least two of the radiofrequency channels being concatenated to form a concatenated channel.

According to an embodiment of the invention, such a signal conveys data addressed to the first destination device on carriers belonging to a first frequency band and data addressed to a second destination device on carriers belonging to a second frequency band, the first frequency band being formed by at least one of the radiofrequency channels of the concatenated channel and the second frequency band being formed by other radiofrequency channels of the concatenated channel.

In particular, such a signal carries at least one indicator of simultaneous sending on the first and second frequency bands. Such a signal may be generated by the method for transmitting described here above.

An embodiment of the invention also pertains to a computer program comprising instructions for implementing a method for transmitting or a method for receiving as described here above when this program is executed by a processor.

BRIEF DESCRIPTION OF THE DRAWINGS

Other features and advantages shall appear more clearly from the following description of a particular embodiment, given by way of a simple illustratory and non-exhaustive example, and from the appended drawings, of which.

DETAILED DESCRIPTION OF ILLUSTRATIVE EMBODIMENTS

1. General Principle

The general principle of an embodiment of the invention relies on the simultaneous sending of data packets addressed to two destination devices, on two frequency bands, each formed by at least one radiofrequency channel of a concatenated channel, thus enabling the occupancy of the concatenated channel to be optimized.

It may be recalled that a concatenated channel is a channel corresponding to the concatenation of several radiofrequency channels, used for a multichannel transmission.

Figure 1:
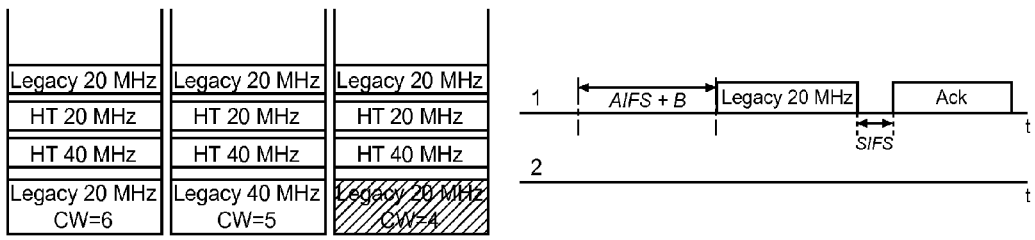
FIG. 1 already commented upon with reference to the prior art, illustrates an example of a mechanism of access to the channels.
Figure 2:
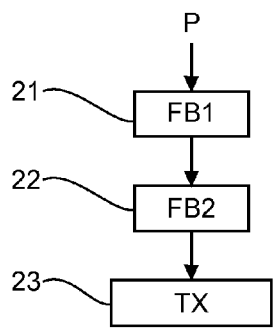
FIG. 2 presents the main steps of the method for transmitting according to one embodiment of the invention.

Thus, as illustrated in FIG. 2, the method for transmitting according to one embodiment of the invention comprises a first step 21 for acquiring and reserving a first frequency band, referenced FB1, for the transmission of data packets addressed to at least one second destination device.

A step 22 for acquiring and reserving a second frequency band, referenced FB2, reserves the radiofrequency channels of the concatenated channel not reserved at the first step, i.e. not included in the frequency band FB1, for the transmission of data packets addressed to at least one second destination device.

A third sending step TX 23 consists in simultaneously sending data packets on the first frequency band FB1 and the second frequency band FB2, addressed respectively to the first and second destination devices.

Thus, the totality of the radiofrequency channels forming the concatenated channel is used to simultaneously transmit data packets towards two or more destination devices.

At reception, the principle of an embodiment of the invention relies on the simultaneous reception of packets on the first and second frequency bands and on the decoding of the packets on one or the other of these two frequency bands, as a function of a signaling received on one and/or the other of the frequency bands.

2. Detailed Description of One Embodiment of the Method For Transmitting 2.1 Acquisition and Reservation of the Frequency Bands Here below, we describe a particular embodiment of the invention.

Figure 3A:
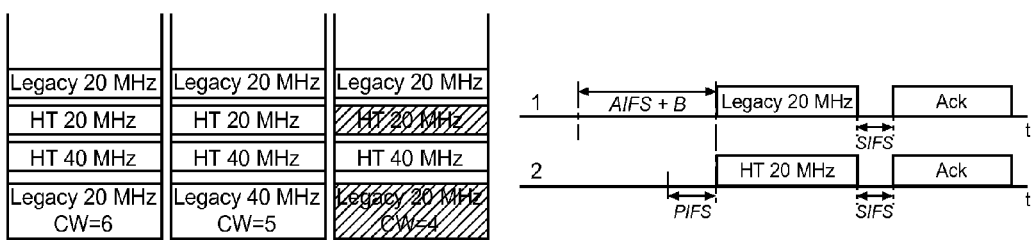
FIGS. 3a and 3b present an example of the channel access mechanism according to one embodiment of the invention.
Figure 3B:
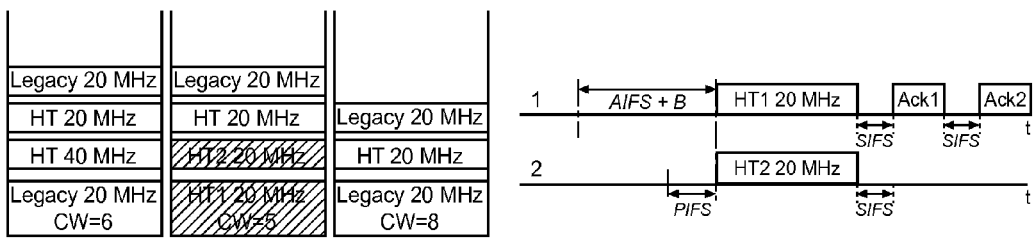

In particular, referring to FIGS. 3a and 3b, we describe first of all the steps for acquiring and reserving the first and second frequency bands by the implementing of a channel access mechanism according to this embodiment of the invention.

In these figures, the left-hand side represents the queues and the packets stored pending transmission by the access point and the right-hand part represents the packets being transmitted. The packets represented with stripes on the left-hand side are those that have been selected for the transmission represented in the right-hand side.

Furthermore, we consider here an example with a 40 MHz concatenated channel, i.e. a channel formed by two 20 MHz radiofrequency channels, the primary channel 1 and the secondary channel referenced 2.

In a first case illustrated in FIG. 3a, it is deemed to be the case that the first packet in the queue of the access point has to be transmitted on a 20 MHz frequency band towards a legacy station. It is represented on the left-hand part of FIG. 3a with stripes and an indication "CW=4" which corresponds to the value of the "backoff". This value is effectively smaller than the other two values, respectively equal to 5 and 6, in the other two queues. This is why this packet is the next one to be sent if the channel 1 is free.

When the channel 1 is free, it is used to transmit this packet to a legacy station and, according to an embodiment of the invention, a second frequency band formed by the channel 2 is used to transmit other packets to an HT destination device. The acquisition and the reservation are done, according to this embodiment of the invention, in listening to the channel 2 for a duration called "PIFS" ending at the same time as the duration ("AIFS+B") of listening to the channel 1 as described here above.

Through an embodiment of the invention, the access point is informed as to whether the primary channel 1 and secondary channel 2 are free or busy even if the next packet to be transmitted is addressed to a legacy station and therefore has to be transmitted solely on the primary channel 1 (20 MHz).

If the channels 1 and 2 are free, and as illustrated in the right-hand part of FIG. 3a, a packet addressed to a legacy station referenced "20 MHz Legacy" is sent on the channel 1, simultaneously with the sending of a packet to an HT station referenced "20 MHz HT" on the channel 2.

In a second case illustrated in FIG. 3b, it is deemed to be the case that the next packet to be transmitted has to be transmitted on a 20 MHz frequency band to the HT station. It is represented on the left-hand part of FIG. 3b with stripes and the indication "CW=5" which corresponds to the value of the backoff. This value is effectively smaller than the other two values which are respectively equal to 6 and 8, in the other two queues, and this is why this packet is the next one to be sent if the channel 1 is free.

When the channel 1 is free, it is used to transmit this packet to an HT station and, according to an embodiment of the invention, a second frequency band formed by the channel 2 is used to transmit other packets to another HT station. The acquisition and reservation are done according to this embodiment of the invention in listening to the channel 2 for a duration called "PIFS" ending at the same time as the listening duration ("AIFS+B") of the channel 1 as described here above.

Through an embodiment of the invention, the access point is informed as to whether the primary channel 1 and the secondary channel 2 are free or busy even if the next packet to be transmitted to an HT station requires only 20 MHz.

If the channels 1 and 2 are free, and as illustrated in the right-hand part of FIG. 3b, a packet addressed to a first HT station referenced "20 MHz HT1" is sent on the channel 1 simultaneously with a packet addressed to a second HT station referenced "20 MHz HT2" on the channel 2.

2.2 Selection of a Data Packet to be Transmitted on the Second Frequency Band

A more detailed description is now provided of the mechanism enabling the selection of the packet to be transmitted addressed to an HT station on the second reserved frequency band.

In general, once the first and second frequency bands have been reserved, the method for transmitting according to this embodiment of the invention provides for the selection of the packet or packets liable to be transmitted on the second frequency band to an HT station. Indeed, depending on the characteristics of the second reserved frequency band and especially its width, i.e. the number of radiofrequency channels that form it (for example two or three 20 MHz channels of a concatenated channel formed by four 20 MHz radiofrequency channels), certain packets waiting in the queues in the access point are more or less suited to being transmitted on this second frequency band.

The mechanism for selecting a packet to be transmitted on the second frequency band simultaneously with a packet on the first frequency band consists first of all in selecting a set of packets addressed to HT stations in therefore "eliminating" packets addressed to legacy stations, since these legacy stations cannot implement the invention and therefore cannot receive packets on the second reserved frequency band according to the invention.

Then, from this set of packets, another selection is made, consisting in selecting the packet or packets that have a transmission time T smaller than the duration of transmission of the packet to be transmitted simultaneously on the first frequency band. This duration of transmission T is computed in taking account of the characteristics of the second frequency band (20 MHz in the examples of FIGS. 3a and 3b).

This constraint is due to the fact that the simultaneous sending of the packets on the first and second frequency bands has to enable the legacy stations to work without modification and therefore without having to take a simultaneous transmission on another frequency band into consideration. For this purpose, the duration of transmission of the packet on the second frequency band must be smaller than that of the packet on the first frequency band in order to be "unseen" by a legacy station. Consequently, when the transmission on the first band is ended, the one on the second band is ended too, thus releasing both frequency bands for subsequent transmission.

By contrast, if the set of packets comprises only packets with a transmission time T that is appreciably smaller than that of the packet sent on the first frequency band, then it is possible to carry out an aggregation of packets, for example by using aggregation techniques defined in the IEEE 802.11n standard so as to "fabricate" an aggregated packet, the transmission time of which is close to that of the packet sent on the first frequency band while at the same time remaining below it.

This selection criterion, based on the transmission time, enables an optimizing of the use of the radiofrequency channels of the concatenated channel.

Among the selected packets, i.e. the packets addressed to the HT stations and having a transmission time T smaller than that of the packet sent on the first frequency band, only one packet has to be chosen in order to be effectively transmitted on the second frequency band, simultaneously with the packet sent on the first frequency band.

Another selection is therefore implemented, applying at least one criterion of selection among the following:

- a criterion taking account of the type of data of the packet or the class of service to which the packet belongs. For example, a "Best Effort" or "Background" type of packet has lower priority than a "Voice" type of packet that requires real-time transmission or a "Video" type packet that requires high-quality transmission. These service classes are for example indicated in the field "QoS control/TID" of the MAC header §7.1.3.5 of the 802.11e standard. A criterion of this kind is chosen especially when it is sought to prefer service quality over throughput rate.
- a criterion taking account of the transmission time as compared with a predetermined transmission throughput rate (for example a transmission on 20 MHz with a particular modulation) making it possible to determine a penalization factor associated with a packet, representing an estimated occupancy of the channel for the transmission of this packet. Thus, a criterion of this kind may consist in choosing the packet which will most penalize the other destination devices if it were transmitted in "classic" fashion, for example by using only one 20 MHz frequency band. For example, a penalization factor $Fp1(Pi)$ is defined for a packet Pi, corresponding to the total time of occupancy of the channel by the packet, referenced $T(Pi)$. This time $T(Pi)$ is computed in taking account of the frequency band used in classic mode (for example 20 or 40 MHz depending on the packets) and a transmission throughput rate envisaged by the access point to transmit this packet Pi as well as the transmission of the headers of the physical layer of the communications network (which is organized into a plurality of communications layers comprising a data link layer known as a MAC layer, delivering data packets to a physical layer known as a PHY layer) and acknowledgements of reception of the packets. A criterion of this kind is chosen especially when it is sought to prefer throughput rate over quality of service.
- a criterion corresponding to a combination of the above two criteria, i.e. taking account both of the priority of the packet and of its total time of occupancy of the channel, referenced $T(Pi)$. Thus, a penalization factor $Fp2(Pi)$ is defined corresponding to an average of the temporal occupancy $T(Pi)$ and the priority of the packets. The temporal occupancy $T(Pi)$ is computed in taking account of the frequency band used in classic mode (for example 20 or 40 MHz depending on the packets) and the transmission throughput rates envisaged for the point of access to transmit this packet Pi as well as the transmission of the headers of the physical layer of the communications network and the acknowledgements of reception of the packets. The temporal occupancy $T(Pi)$ is then divided by the minimum temporal occupancy among the packets to be selected, giving: $\min(T(Pi))$, for $i=0 \ldots Pi\_max$. The priority of the packets is computed on the basis of the contention window referenced $CW(Pi)$, divided by the minimum contention window among the packets to be selected, giving: $\min(CW(Pi))$, for $i=0 \ldots Pi\_max$. Thus, the penalization factor is written as follows: $Fp2(Pi)=T(Pi)/\min(T(Pi))+CW(PI)/\min(CW(Pi))$, $i=0 \ldots Pi\_max$, the packet with the smallest value of $Fp2(Pi)$ being selected. A criterion of this kind is chosen especially when it is sought to prefer an approach that is an intermediate approach between quality of service and throughput rate.

Once at least one of the selection criteria has been applied, a signaling step described here below is implemented before the sending proper of the packets.

2.3 Signaling of Simultaneous Transmission on Two Frequency Bands

Figure 4A:
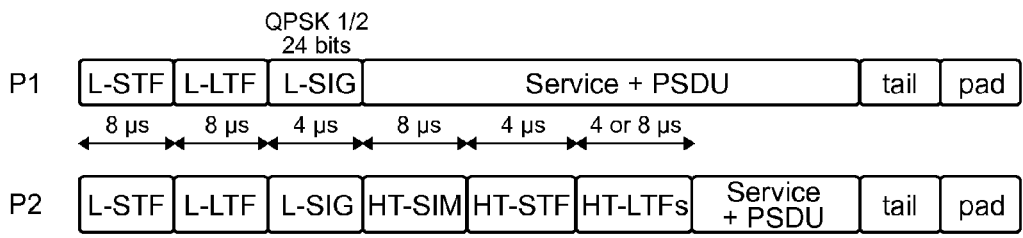
FIGS. 4a and 4b describe two examples of signaling according to embodiments of the invention.
Figure 4B:
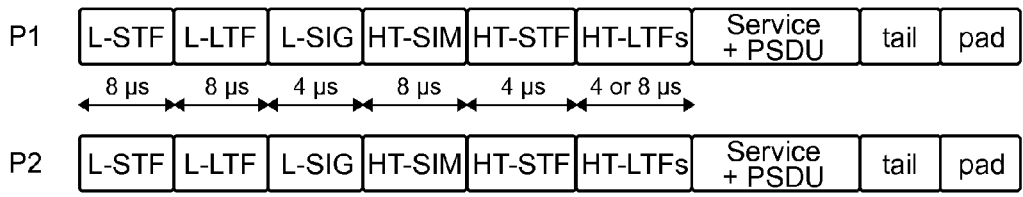

A description is now provided with reference to FIGS. 4a and 4b of the signaling implemented according to this embodiment of the invention enabling, on the one hand, a legacy station to receive packets on the first reserved frequency band accurately and without being informed of the simultaneous transmission on the second frequency band and, on the other hand, the HT station which is the destination of the packets on the second frequency band to receive, detect and decode these packets accurately.

We again consider the two examples illustrated in FIGS. 3a and 3b, namely:

- a first example in which a packet addressed to a legacy station is sent on the first reserved frequency band simultaneously with the transmission of a packet addressed to an "HT station on the second frequency band;
- a second example in which a packet addressed to a first station "HT1" is sent on the first reserved frequency band simultaneously with the transmission of a packet addressed to a second station "HT2" on the second frequency band.

In the first example, the pieces of data addressed to the legacy station are placed on the sub-carriers corresponding to the primary channel 1 and the pieces of data addressed to the station HT are placed on the sub-carriers corresponding to the secondary channel 2 as illustrated in FIG. 4a.

Preambles specific to the HT station, referenced HT-SIM, HT-STF and HT-LTFs, are sent on the secondary channel after the sending of the legacy signaling preambles referenced L-STF, L-LTF and L-SIG, relating especially to pieces of synchronization information.

According to a first alternative embodiment, these preambles comprise especially a "simultaneous sending" field in the HT-SIM indicating that a simultaneous sending operation is active. In this way, the HT station receiving the data on the second frequency band is informed of the simultaneous sending.

According to a second alternative embodiment, a field in the HT-SIM also indicates the order of the simultaneous transmission, namely that the simultaneous transmission is implemented on the channel 2, it being known that the radiofrequency channel used to form the first frequency band for a transmission to a legacy station is referenced channel 1.

According to a third alternative embodiment, a field in the HT-SIM preamble enables the reporting of the channels used for the simultaneous transmission, for example the channel 2 (if the concatenated channel includes only two radiofrequency channels) or the channels 2 to 4 (if the concatenated channel comprises four radiofrequency channels) forming the second frequency band are used for transmission towards an HT station implementing an embodiment of the invention.

For example, if we consider the first example illustrated in FIG. 3a corresponding to a 40 MHz concatenated channel, we observe:
- on the primary channel 1: the sending of the legacy preambles as defined by the legacy standards;
- on the secondary channel 2: the sending of preambles specific to the HT station with, in the HT-SIM, the field corresponding to the primary channel set at 0 and the field corresponding to the secondary channel set at 1.

Similarly, if we consider an 80 MHz concatenated channel (i.e. a channel formed by four 20 MHz radiofrequency channels) with a data packet addressed to a legacy station on the primary channel 1 and a data packet addressed simultaneously to an HT station on the secondary channel 2, tertiary channel 3 and quaternary channel 4, forming a second 60 MHz frequency band, we observe:
- on the primary channel 1: the sending of legacy preambles as defined by the legacy standards;
- on the secondary channel 2: the sending of preambles specific to the HT station with, in the HT-SIM preamble, the primary channel set at 0 and the fields corresponding to the secondary, tertiary and quaternary channels set at 1;
- on the tertiary channel: the same preambles as on the secondary channel according to a technique similar to the known technique of duplication of the 802.11n standard, called the "duplicate mode", enabling the duplication of the signal transmitted on the primary channel in the secondary channel in using a double-sized Fourier transform (FFT) and in copying the data transmitted on the sub-carriers corresponding to the primary channel to the sub-carriers corresponding to the secondary channel;
- on the quaternary channel: the same preambles as on the secondary channel according to the technique similar to the "duplicate mode" described here above.

According to a fourth alternative embodiment, the field in the HT-SIM makes it possible to indicate also an identifier of an HT destination device in such a way that this device can be informed of the packets addressed to it. This identifier is for example the "AID" (Association Identifier) of the station or a hash function between the "AID" and the "BSSID" (Basic Service Set Identifier).

For example, if we consider the first example illustrated in FIG. 3a corresponding to a 40 MHz concatenated channel we observe the following:
- on the primary channel 1: the sending of legacy preambles as defined by the legacy standards;
- on the secondary channel 2: the sending of preambles specific to the HT station with, in the HT-SIM, the field corresponding to the primary channel set at 0 and the field corresponding to the secondary channel set at 1, and an additional field denoted for example as "destination" indicating the identifier of the destination station.

Similarly, if we consider an 80 MHz concatenated channel, we observe:
- on the primary channel 1: the sending of legacy preambles as defined by the legacy standards;
- on the secondary channel 2: the sending of preambles specific to the HT station with, in the HT-SIM, the field corresponding to the primary channel set at 0 and the fields corresponding to the secondary, tertiary and quaternary channels set at 1 and an additional field denoted for example as "destination" indicating the identifier of the destination station;
- on the tertiary channel: the same preambles as on the secondary channel, according to a technique similar to the duplication technique of the 802.11n standard, called "duplicate mode" enabling the duplication of the signal transmitted on the primary channel in the secondary channel in using a double-sized FFT and in copying the data transmitted on the sub-carriers corresponding to the primary channel to the sub-carriers corresponding to the secondary channel;
- on the quaternary channel: the same preambles as on the secondary channel, according to a technique similar to the "duplicate mode" described here above.

It must be noted that, when the identifier of the destination station is reported in the preambles, it is informed upon reception of these preambles that the packet sent on the second frequency band are addressed to it and can therefore, as of this instant, decode only the packets sent on this second frequency band.

By contrast, when the identifier of the destination station is not reported in the preambles, this station must decode both the data sent on the first frequency band and the data sent on the second frequency band, because the destination information then is present only at the level of the MAC layer and is therefore accessible only after decoding of the PHY layer.

We now consider an example where the packets addressed to a first station "HT1" are sent on the first frequency band and the packets addressed to a second station "HT2" are sent on the second frequency band (as for example in the case illustrated in FIG. 3b).

In this case, the pieces of data addressed to the first station "HT1" are placed on the sub-carriers corresponding to the primary channel 1 and the pieces of data addressed to the second station "HT2" are placed on the sub-carriers corresponding to the secondary channel 2 as illustrated in FIG. 4b.

Preambles specific to the first station "HT1", denoted as HT-SIM, HT-STF and HT-LTFs, are sent on the primary channel, after the sending of the legacy reporting preambles, denoted as L-STF, L-LTF and L-SIG, carrying especially synchronization information.

Similarly, preambles specific to the second station "HT2", denoted as HT-SIM, HT-STF and HT-LTFs, are sent on the primary channel after the sending of the legacy signaling preambles.

These preambles are the same as those described here above with their different variants.

Thus, the preambles specific to the first station "HT1" report for example that a simultaneous transmission is active ("simultaneous transmission" field=1) and indicates the channels occupied by this transmission (primary channel=1 and secondary channel=0).

As we have seen here above, it is also possible to signal the identifier of the destination station of the transmission (HT1).

Similarly, the preambles specific to the first station "HT2" indicate for example that a simultaneous transmission is active ("simultaneous transmission" field=1) and indicates the channels occupied by this transmission (primary channel=1 and secondary channel=1). As we have seen here above, it is also possible to indicate the identifier of the destination station of the transmission (HT2).

Similarly, if we consider an 80 MHz concatenated channel (i.e. formed by four 20 MHz radiofrequency channels), with a data packet sent to a first station "HT1" on the primary channel 1 and secondary channel 2, forming a first 40 MHz frequency band, and a data packet sent simultaneously to a second station "HT2" on the tertiary channel 3 and quaternary channel 4, forming a second 40 MHz frequency band, we observe:
- on the primary channel 1: the sending of preambles specific to the station "HT1" with, in the HT-SIM, the field corresponding to the primary channel set at 1, the field corresponding to the secondary channel set at 1 and the fields corresponding to the tertiary and quaternary channels set at 0, the simultaneous transmission field set at 1 and the "destination" field set at "HT1";

on the secondary channel 2: a duplication of the preambles of the primary channel;

on the tertiary channel 3: the sending of preambles specific to the station "HT2" with, in the HT-SIM, the field corresponding to the primary and secondary channels set at 0 and the fields corresponding to the tertiary and quaternary channels set at 1, the "simultaneous transmission" field set at 1 and the "destination" field set at HT2;

on the quaternary channel 4: a duplication of the preambles of the tertiary channel.

Once these preambles have been transmitted, the pieces of data proper are sent on the reserved frequency bands.

3. Structure of an Access Point

Figure 5:
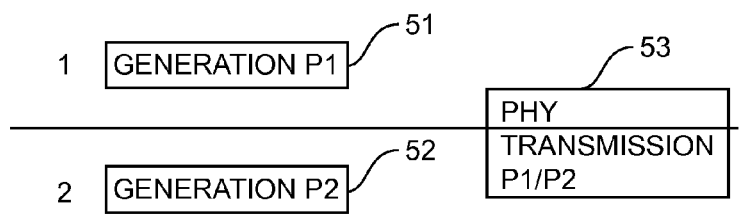
FIG. 5 illustrates an example of a simplified structure of an access point according to one embodiment of the invention.

FIG. 5 illustrates an example of a simplified structure of an access point according to one embodiment of the invention, for example for a simultaneous sending of packets P1 and P2 of data respectively on the primary channel 1 addressed to a first destination device and on a secondary channel 2 addressed to a second destination device.

The generation of the data and preambles is independent between the two channels, namely the primary channel 1 and the secondary channel 2. Thus, the means for generating data and preambles 51 for the packet P1 sent on the primary channel are distinct from the means for generating data and preambles 52 for the packet P2 sent on the secondary channel.

By contrast, the means for transmitting at the physical layer 53 are partially shared, as illustrated in FIG. 5, especially as regards the binary symbol encoding, and the OFDM modulation.

According to one variant, the means for transmitting 53 may also be completely independent.

An access point such as this also includes means for acquiring and reserving the frequency bands implemented preliminarily to the generation means 51 and 52.

4. Detailed Description of an Embodiment of the Method For Receiving

Figure 6:
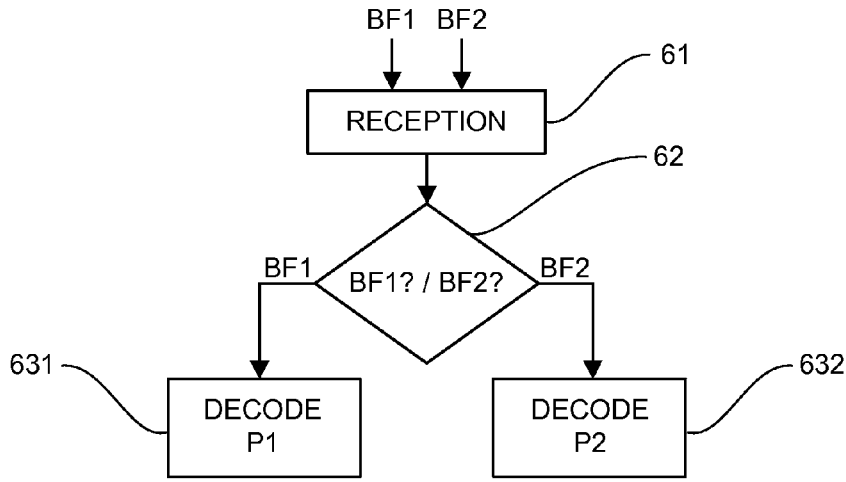
FIG. 6 presents the main steps of the method for receiving according to one embodiment of the invention.

Referring now to FIG. 6, we describe the main steps of the method for receiving according to one embodiment of the invention.

At a first step for receiving 61, the data packets sent simultaneously on the frequency bands FB1 and FB2 are received, in particular the signaling information enabling the destination device implementing the method for receiving according to this embodiment to know the frequency band on which the packets addressed to it are being sent.

Thus, at a step 62, the signaling information is processed and the packets P1 received on the frequency band FB1 or the packets P2 received on the frequency band FB2 are decoded at a decoding step 631 or 632, according to the signaling received. These decoding steps 631 and 632 are implemented on either of the frequency bands FB1 or FB2.

As already indicated here above, when the signaling indicates an identifier of the destination device, then this device is informed of the packets addressed to it and can decode the packets on the frequency band that concerns it, in not processing the packets received on the other frequency band.

When the signaling indicates that a simultaneous transmission is active, without identifying the concerned destination devices, each device must implement a decoding at the MAC layer in order to know which are the packets addressed to it.

We shall now consider the case of an HT station for which packets are sent on a second frequency band simultaneously with packets sent on a first frequency band, addressed to a legacy station.

This particular situation of an embodiment of the invention presents especially the specific features related to the fact that the duration of transmission of the packets on each of the two frequency bands is not necessarily the same and that the transmission characteristics (modulation, encoding, etc.) can be different and therefore the acknowledgements of reception of the packets sent on each of the destination stations can also be of different sizes.

Figure 7A:
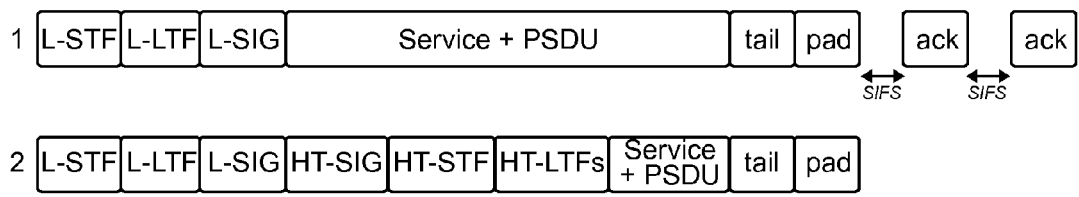
FIGS. 7a and 7b describe two examples of acknowledgement mechanisms according to embodiments of the invention.
Figure 7B:
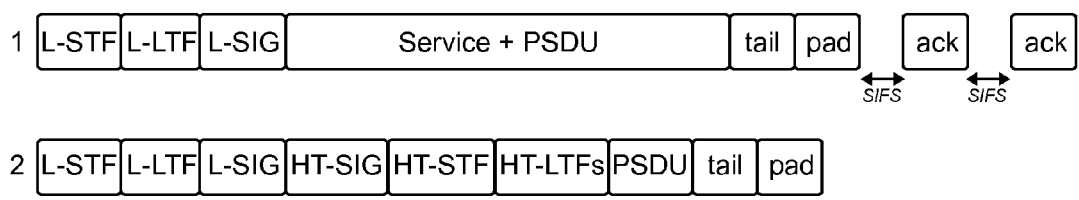

An embodiment of the invention therefore provides a specific mechanism for managing acknowledgements of reception of the packets sent by each of the destination stations, enabling the sending, on the primary channel only, of the acknowledgements of reception of the packets sent on the two frequency bands as illustrated in FIGS. 7a and 7b.

The acknowledgements of reception are sent on the primary channel in a predetermined order corresponding to the ascending order of channels in the concatenated channel. For example, the acknowledgement of reception of packets on the primary channel is sent first and then that of the packets received on the secondary channel and so on and so forth for the tertiary and quaternary channels in the case of an 80 MHz concatenated channel.

To this end, the HT station receiving packets on the second frequency band listens to the primary channel as soon as the second frequency band is released, at the end of the transmission of a packet, in order to detect the end of transmission of the acknowledgement of reception of the packet on the primary channel. This detection is based for example on the short inter-frame spacing denoted as SFIS.

When the SFIS is detected, the HT station can then transmit the acknowledgement corresponding to the reception of the packet on the second frequency band.

FIG. 7b provides a more particular illustration of the case where the duration of transmission of the packet sent on the second frequency band is smaller than that of the packet sent on the primary channel. In this case, the second frequency band is released at the end of transmission without necessitating the transmission of padding packets to make the duration of transmission of the packet on the second frequency band coincide with the duration of transmission of the packet transmitted on the first frequency band.

5. Structure of a Destination Device

Figure 8:
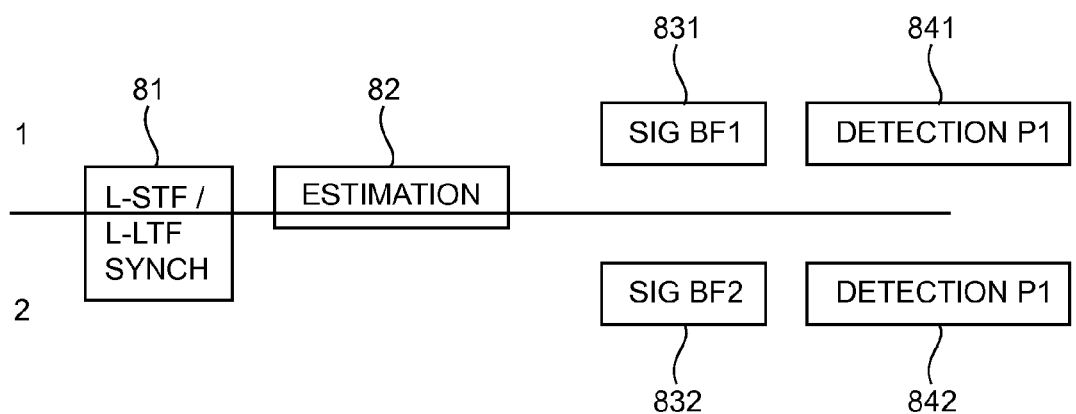
FIG. 8 illustrates an example of a simplified structure of a destination device according to one embodiment of the invention.

FIG. 8 illustrates an example of a simplified structure of a destination device according to one embodiment of the invention, for example for a reception of data packets sent simultaneously on a primary channel 1 addressed to a first destination device and on a secondary channel 2 addressed to a second destination device.

We consider for example the case of a destination device implementing an embodiment of the invention, for example an HT station to which packets are sent on the secondary channel 2.

First means 81 for processing pieces of L-STF and L-LTF synchronization information as well as channel estimation means 82 are shared between the two channels 1 and 2.

By contrast, distinct means 831 and 832 for processing L-SIG signaling information are implemented for each of the channels 1 and 2. Indeed, as described here above, preambles specific to the HT station are sent on the frequency band FB2, while legacy type preambles are transmitted on the frequency band FB1 (if the packets sent on this frequency band are addressed to a legacy station).

On the basis of the processing of pieces of signaling information, the means implemented for receiving packets on each of the two frequency bands, as well as the decoding means, are distinct.

For example, distinct means 841 and 842 for detecting pieces of data are implemented with a view to their decoding.

According to one variant, not shown, the pieces of data received are stored in a buffer for subsequent processing.

It is also possible for a destination device to be directly designed to receive data transmitted according to an embodiment of the invention, in which case the signaling information is not necessary.

Although the present disclosure has been described with reference to one or more examples, workers skilled in the art will recognize that changes may be made in form and detail without departing from the scope of the disclosure and/or the appended claims.

The invention claimed is:

1. A method comprising:
   transmitting data packets in a communications network using a plurality of radiofrequency channels, at least two of said radiofrequency channels being concatenated to form a concatenated channel, wherein transmitting comprises:
   a first step of acquiring and reserving at least one of the radiofrequency channels of the concatenated channel, reserving a first frequency band for transmission of data packets to a first destination device;
   a second step of acquiring and reserving radiofrequency channels of the concatenated channel not reserved during the first step of acquiring and reserving, reserving a second frequency band for transmission of data packets to at least one second destination device;
   at least one step of selecting a data packet from among said data packets to be transmitted to at least one second destination device;
   a step of generating at least one preamble specific to said selected packet, said preamble or preambles comprising at least one indicator of simultaneous sending on said first and second frequency bands, and
   a step of simultaneous sending of said data packets on said first and second frequency bands, of said selected packet and of said specific preamble or preambles, before said selected packet, on only said second frequency band.

2. The method according to claim 1, wherein said step of selecting comprises a first sub-step of selecting a set of at least one data packet from among said data packets to be transmitted to at least one second destination device in taking account of the duration of transmission of the packets and the capacity of said at least one second destination device to receive data packets on said second frequency band.

3. The method according to claim 2, wherein said step of selecting comprises a second sub-step of selecting a data packet in said set, delivering said selected packet,
   said second sub-step of selecting taking account of at least one of the criteria belonging to the group consisting of:
   a criterion of priority taking account of the type of data of said packet;
   a duration of transmission of said data packet for a predetermined transmission throughput rate.

4. The method according to claim 1, wherein the method comprises a step of generating at least one preamble specific to the data packets addressed to said first destination device, said specific preamble or preambles comprising at least one indicator of simultaneous sending on said first and second frequency bands, and said sending step sends said specific preamble or preambles, before said packets, on said first frequency band.

5. The method according to claim 1, wherein said specific preamble furthermore comprises at least one indicator belonging to the group consisting of an:
   indicator of order of simultaneous sending;
   indicator of said radiofrequency channel or channels forming said second frequency band;
   indicator of said radiofrequency channel or channels forming said first frequency band;
   indicator of said second destination device;
   indicator of said first destination device.

6. The method according to claim 1, wherein said first and second steps for acquiring and reserving implement:
   an operation for listening to one of said radiofrequency channels forming said first frequency band, denoted as a primary channel, for a predetermined duration, and
   an operation for listening to said other radiofrequency channels of said concatenated channel for a duration equal to one inter-frame for controlled access by a transmission device, denoted as PIFS, having an end that coincides with the end of said predetermined duration.

7. The method according to claim 1, wherein the method comprises a step of receiving, on at least one of said radiofrequency channels composing the first frequency band, denoted as a primary channel, acknowledgements associated with the packets sent simultaneously on the first and second frequency bands.

8. A device for transmitting data packets in a communications network using a plurality of radiofrequency channels,
   at least two of the radiofrequency channels being concatenated to form a concatenated channel,
   wherein the device comprises:
   first means for acquiring and reserving at least one of the radiofrequency channels of the concatenated channel, reserving a first frequency band for the transmission of data packets to a first destination device;
   second means for acquiring and reserving radiofrequency channels of said concatenated channel not reserved by said first means for acquiring and reserving, reserving a second frequency band for the transmission of data packets to at least one second destination device;
   means for simultaneously sending the data packets on the first and second frequency bands;
   means for selecting a data packet from among said data packets to be transmitted to at least one second destination device;
   means for generating at least one preamble specific to said selected packet, said at least one specific preamble comprising at least one indicator of simultaneous sending on said first and second frequency bands, and
   means for sending of said at least one specific preamble, before said selected packet, on only said second frequency band.

9. A method comprising:
   receiving data packets in a communications network using a plurality of radiofrequency channels, at least two of the radiofrequency channels being concatenated to form a concatenated channel, wherein receiving comprises:
   a step of receiving data packets sent simultaneously on a first and second frequency bands, said first frequency band being formed by at least one of said radiofrequency channels of said concatenated channel and said second frequency band being formed by the other radiofrequency channels of said concatenated channel; and a step of decoding data packets sent on only one of said first and second frequency bands as a function of signaling received on only one of said first and second frequency bands.

10. The method according to claim 9, wherein the method comprises a step of receiving at least one specific preamble sent on said first and/or said second frequency bands,
and wherein said step of decoding is implemented either on the packets sent on said first frequency band or on the packets sent on said second frequency band, as a function of at least one indicator of simultaneous sending present in said specific preamble or preambles.

11. The method according to claim 9, wherein the method comprises a step of sending, on one of said radiofrequency channels forming said first frequency band, denoted as a primary channel, an acknowledgment of reception of a packet sent on said second frequency band, and
wherein said step of sending an acknowledgement being implemented after detection of an acknowledgment of reception of a packet sent simultaneously on said first frequency band.

12. A destination device for receiving data packets in a communications network using a plurality of radiofrequency channels,
at least two of the radiofrequency channels being concatenated to form a concatenated channel,
wherein the device comprises:
means for receiving data packets sent simultaneously on a first and second frequency bands, said first frequency band being formed by at least one of said radiofrequency channels of said concatenated channel and said second frequency band being formed by non-reserved radiofrequency channels of said concatenated channel; and
means for decoding data packets sent on only one of said first and second frequency bands as a function of the signaling received on only one of said first and second frequency bands.

13. A method comprising:
generating a multicarrier signal configured to transmit in a communications network using a plurality of radiofrequency channels, at least two of the radiofrequency channels being concatenated to form a concatenated channel, wherein the signal comprises data addressed to a first destination device on carriers belonging to a first frequency band and data addressed to a second destination device on carriers belonging to a second frequency band, said first frequency band being formed by at least one of said radiofrequency channels of said concatenated channel and said second frequency band being formed by other radiofrequency channels of said concatenated channel, and said signal comprising at least one specific preamble, which is specific to a selected packet, said at least one specific preamble comprising at least one indicator of simultaneous sending of a plurality of data packets on said first and second frequency bands, and said at least one specific preamble being sent before said selected packet, on only said second frequency band; and
transmitting the signal in the communication network using the plurality of radiofrequency channels.

14. A non-transitory computer-readable medium comprising a computer program recorded thereon and comprising instructions for implementing a method when this program is executed by a processor, wherein the method comprises:
transmitting data packets in a communications network using a plurality of radiofrequency channels, at least two of said radiofrequency channels being concatenated to form a concatenated channel, wherein transmitting comprises:
a first step of acquiring and reserving at least one of the radiofrequency channels of the concatenated channel, reserving a first frequency band for transmission of data packets to a first destination device;
a second step of acquiring and reserving radiofrequency channels of the concatenated channel not reserved during the first step of acquiring and reserving, reserving a second frequency band for transmission of data packets to at least one second destination device;
at least one step of selecting a data packet from among said data packets to be transmitted to at least one second destination device;
a step of generating at least one preamble specific to said selected packet, said preamble or preambles comprising at least one indicator of simultaneous sending on said first and second frequency bands, and
a step of simultaneous sending of said data packets on said first and second frequency bands, of said selected packet and of said specific preamble or preambles, before said selected packet, on only said second frequency band.

15. A non-transitory computer-readable medium comprising a computer program recorded thereon and comprising instructions for implementing a method when this program is executed by a processor, wherein the method comprises:
receiving data packets in a communications network using a plurality of radiofrequency channels, at least two of the radiofrequency channels being concatenated to form a concatenated channel, wherein receiving comprises:
a step of receiving data packets sent simultaneously on a first and second frequency bands, said first frequency band being formed by at least one of said radiofrequency channels of said concatenated channel and said second frequency band being formed by the other radiofrequency channels of said concatenated channel; and
a step of decoding data packets sent on only one of said first and second frequency bands as a function of the signaling received on only one of said first and second frequency bands.

* * * * *